US006659424B2

(12) United States Patent
Buse et al.

(10) Patent No.: US 6,659,424 B2
(45) Date of Patent: Dec. 9, 2003

(54) VALVE ARRANGEMENT FOR PRESSURE REGULATION OF FUEL SUPPLY IN AN INTERNAL COMBUSTION ENGINE

(75) Inventors: Werner Buse, Kaarst (DE); Janusz Zurke, Wuppertal (DE); Albert Denne, Meerbusch (DE)

(73) Assignee: Pierburg GmbH, Neuss (DE)

( * ) Notice: Subject to any disclaimer, the term of this patent is extended or adjusted under 35 U.S.C. 154(b) by 17 days.

(21) Appl. No.: 10/068,206

(22) Filed: Feb. 5, 2002

(65) Prior Publication Data

US 2002/0113220 A1 Aug. 22, 2002

(30) Foreign Application Priority Data

Feb. 17, 2001 (DE) ........................................ 101 07 618

(51) Int. Cl.[7] .......................... F02M 63/00; F16K 31/02
(52) U.S. Cl. .............................. 251/129.15; 251/129.18
(58) Field of Search ........................ 251/129.15–129.22

(56) References Cited

U.S. PATENT DOCUMENTS

| | | | | | |
|---|---|---|---|---|---|
| 3,974,998 | A | * | 8/1976 | Wood | 251/76 |
| 4,251,051 | A | * | 2/1981 | Quenneville et al. | 251/129 |
| 4,712,767 | A | * | 12/1987 | Losser et al. | 251/129.15 |
| 4,750,704 | A | * | 6/1988 | Brundage | 251/129.18 |
| 4,998,559 | A | * | 3/1991 | McAuliffe, Jr. | 251/129.14 |
| 5,462,253 | A | * | 10/1995 | Asthana et al. | 251/129.16 |
| 5,546,987 | A | * | 8/1996 | Sule | 251/199.16 |
| 5,570,721 | A | | 11/1996 | Funke et al. | 137/625.65 |
| 5,626,325 | A | | 5/1997 | Buchanan et al. | 251/129.14 |
| 5,636,828 | A | * | 6/1997 | Brehm et al. | 251/129.14 |
| 5,676,345 | A | | 10/1997 | Zurke et al. | 251/129.15 |
| 5,918,856 | A | * | 7/1999 | Scharnowski et al. | 251/129.15 |
| 5,947,442 | A | | 9/1999 | Shurman et al. | 251/129.19 |
| 6,199,533 | B1 | * | 3/2001 | Morris et al. | 251/129.15 |
| 6,279,603 | B1 | * | 8/2001 | Czarnik et al. | 251/129.15 |

FOREIGN PATENT DOCUMENTS

| | | |
|---|---|---|
| EP | 0267162 | 5/1988 |
| GB | 2158612 | 11/1985 |

* cited by examiner

*Primary Examiner*—Paul J. Hirsch
(74) *Attorney, Agent, or Firm*—Ladas & Parry

(57) ABSTRACT

Valve arrangement for pressure regulation of fuel introduction in an internal combustion engine having a pressure regulation and a shutoff function that can be actuated by an electromagnetic drive. A housing is provided with at least one inlet connection and at least one outlet connection, which are connected to one another by a connection channel. The electromagnetic drive includes an armature which acts on a tappet supporting a closing element, which opens or closes the connection channel. At least one pressure spring element acts on the closing element either directly or indirectly in the closing direction. The armature is supported by a core which can adjust the electromagnetic force applied to the armature.

24 Claims, 2 Drawing Sheets

VALVE ARRANGEMENT FOR PRESSURE REGULATION OF FUEL SUPPLY IN AN INTERNAL COMBUSTION ENGINE

FIELD OF THE INVENTION

The invention relates to a valve arrangement for the pressure regulation of the fuel supply in an internal combustion engine having at least one pressure regulating device and a shutoff device that can be actuated by an electromagnetic drive.

BACKGROUND

Valve arrangements are known for engines with direct fuel injection. Such engines require injection pressures of approximately 100 to 120 bars. This pressure is produced by high-pressure pumps, which are very sensitive to cavitation and therefore, the fuel that is introduced must be free of vapor bubbles. Under normal engine operation, a positive pressure of approximately 4 bars is sufficient to transport the fuel free of vapor bubbles from a delivery pump to the high-pressure pump. During engine startup, however, the pressure must be increased to approximately 7 bars in order to suppress the formation of vapor bubbles and to reliably establish the injection pressure when the engine is started without utilizing a mechanical high-pressure pump. The required increase in pressure to 7 bars is achieved by a shutoff device that can be activated electromagnetically and by a 4-bar pressure regulation device arranged in front of or behind the shutoff device.

Such a valve arrangement requires a very large structural space and is also very expensive due to the increased expenditure for its assembly.

SUMMARY OF THE INVENTION

An object of the present invention is to provide apparatus for overcoming the problems discussed above.

The object is achieved in that a housing is provided with at least one inlet connection and at least one outlet connection, which are in fluid communication by a connection channel, wherein the electromagnetic drive opens or closes the connection channel by means of an armature on a tappet with a closing element, and with at least one pressure spring element which acts directly or indirectly on the closing element in the closing direction.

In this way, a valve arrangement is obtained, which is simple and inexpensive to manufacture and also requires less structural space and a smaller expenditure for assembly. Both the pressure regulation of the fuel supply as well as the shutoff capability is assured by this single component.

In a first embodiment, magnetic force acts on the armature in the closing direction of the closing element, and, in addition, the pressure spring, which is supported on the housing, acts on the armature in the closing direction. This embodiment represents a so-called "current-free open" variant. That is, in the absence of electrical current a low pressure level of approximately 4 bars is established by means of the pressure spring. When electrical current is supplied, a magnetic force is applied to the tappet by means of the armature, which raises the pressure to a high-pressure level of approximately 7 bars including the pressure spring.

In a second embodiment, the magnetic force acts on the armature in opposition to the closing direction of the closing element and a first pressure spring acts on the armature in the closing direction, while a second pressure spring acts on the tappet in the closing direction. Both pressure springs are supported by the housing. In this way, a "current-free closed" variant of the valve arrangement is produced. The spring forces of the two pressure springs add up to approximately 7 bars when no current is supplied. When current is supplied, the magnetic force acts against the first pressure spring, so that only the second pressure spring with a pressure of approximately 4 bars acts on the tappet in the closing direction.

A particularly simple valve arrangement is then produced if the housing has two inlet connections and two outlet connections. The first inlet connection is connected to the delivery pump and the second inlet connection is connected to the return line from the high-pressure pump. The first outlet connection is connected to the admission line of the high-pressure pump and the second outlet connection is connected to the return line to the fuel tank.

The housing contains an armature core that can be adjustably moved in the housing and which supports the pressure spring such that the pressure applied by the armature can be adjusted in a simple manner. It is also particularly advantageous if the electromagnetic drive has a proportional magnet system, wherein the armature core has an elliptical outer contour. The armature core is thus not exactly round at the magnetic flux transmission site, so that minimum and maximum magnetic forces can be obtained by a 90° rotation of the core which in turn makes possible a force adjustment of the electromagnet drive.

DETAILED DESCRIPTION

Figure 1:
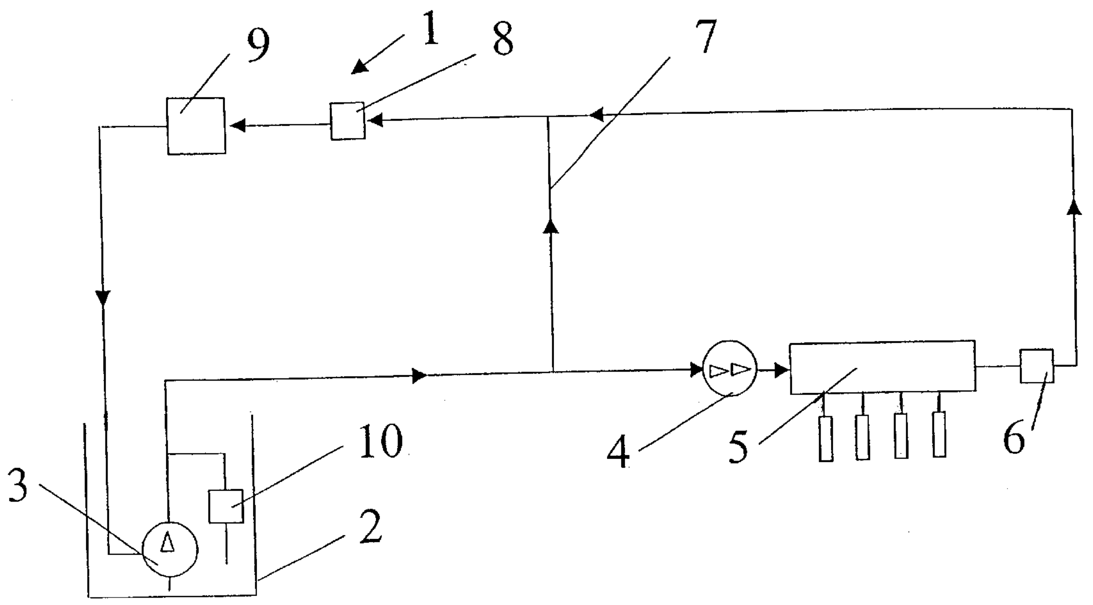
Fig. 1 (PRIOR ART)
FIG. 1 is a schematic illustration of a conventional fuel flow system in an internal combustion engine.

FIG. 1 shows schematically a fuel flow circuit for an internal combustion engine in which a pressure regulation of the fuel delivery is obtained by a valve arrangement 1. The fuel is transported from a fuel tank 2 by a delivery pump 3 to a high-pressure pump 4, which introduces the fuel at a pressure of approximately 100 to 120 bars to a fuel distributor 5. A pressure regulator 6, which is arranged downstream of the distributor 5, regulates the outlet fuel pressure to 4 bars. The fuel is then directly introduced into valve arrangement 1 or is introduced in conjunction with the fuel present in a bypass line 7. In the conventional case, valve arrangement 1 comprises a pressure regulating valve 8 and a shutoff valve 9. Fuel is led back into fuel tank 2 from shutoff valve 9.

The fuel flow circuit functions as follows:

When the engine is started, shutoff valve 9 is closed, so that pressure regulating valve 8, which opens at a pressure valve value of approximately 4 bars, is out of operation. Delivery pump 3 delivers fuel at a pressure of approximately 7 bars. A pressure regulator 10 is arranged in the fuel tank to open at a pressure of more than 7 bars. In this way, during the start-up phase, fuel is delivered free of vapor bubbles to high-pressure pump 4, which produces injection pressures of approximately 100 to 120 bars and introduces the fuel to distributor 5. During the normal operation phase, shutoff valve 9 is opened by means of an electromagnetic drive, so that a pressure of approximately 4 bars is produced in the fuel circuit by pressure regulation valve 8. Fuel in front of high-pressure pump 4 or afer pressure regulation valve 6 can be returned to valve arrangement 1 and from there into fuel tank 2.

Figure 2:
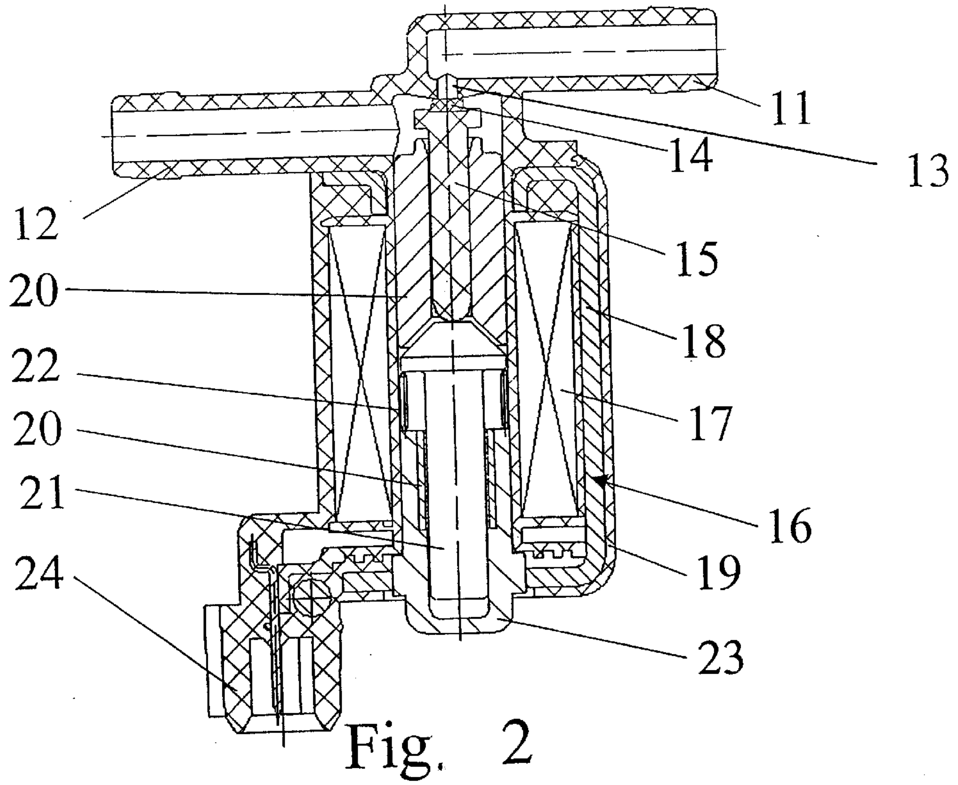
FIG. 2 is a cross sectional view of a first embodiment of the valve arrangement according to the invention.

FIG. 2 shows a first embodiment of the valve arrangement 1 according to the invention. The valve arrangement 1 has an inlet connection 11 and an outlet connection 12, which are connected to one another by a connection channel 13. The connection channel can be opened or closed by a closing element 14. Closing element 14 is arranged on a tappet 15 which is actuated by an electromagnetic drive 16 to selectively open and close connection channel 13. The tappet 15 travels in a guide bush 20.

Electromagnetic drive 16 comprises a coil 17, which cooperates with an electromagnetic yoke 18. The coil 17 and yoke 18 are arranged in an injection-molded housing 19. In addition, an armature 21 is mounted in a second guide bush 20 so that the armature 21 can be moved in a longitudinal direction. A pressure spring 22 acts on armature 21 in the closing direction of closing element 14. Pressure spring 22 is supported on a core 23 which is supported in housing 19 for adjustable longitudinal and rotational movement. By adjusting the longitudinal position of the core 23 in the housing 19 the spring force can be adjusted. By making the outer contour of the core elliptical, when the core is turned by 90°, the magnetic force can be adjusted between maximum and minimum values on the armature. After the core is adjusted in its longitudinal and angular positions in the housing the core is secured by suitable means, such as, a bolt, clamp, screw or the like. The current supply of the electromagnetic drive is provided by a plug connection 24.

The valve arrangement 1 in FIG. 2 serves as a current-off open embodiment and functions as follows:

In the operation phase of the engine, the electromagnetic drive 16 is not supplied with electrical current. Accordingly, magnetic force is not applied to armature 21 and valve arrangement 1 is in a current-off open state. Pressure spring 22 has a low pressure level of approximately 4 bars. Now, if a system pressure which is greater than 4 bars is reached in the fuel cycle circuit, closing element 14 opens against the action of pressure spring 22 and fuel can be returned to fuel tank 2. In the current applied state, armature 21 is pressed against tappet 15 by the magnetic force and by the spring force. The magnetic force can be adjusted so that a pressure level of approximately 7 bars is reached. Valve arrangement 1 then only opens at a pressure level in the fuel circuit, which is higher than 7 bars. As has already been described the magnetic force is adjusted by rotating the armature core 23.

Figure 3:
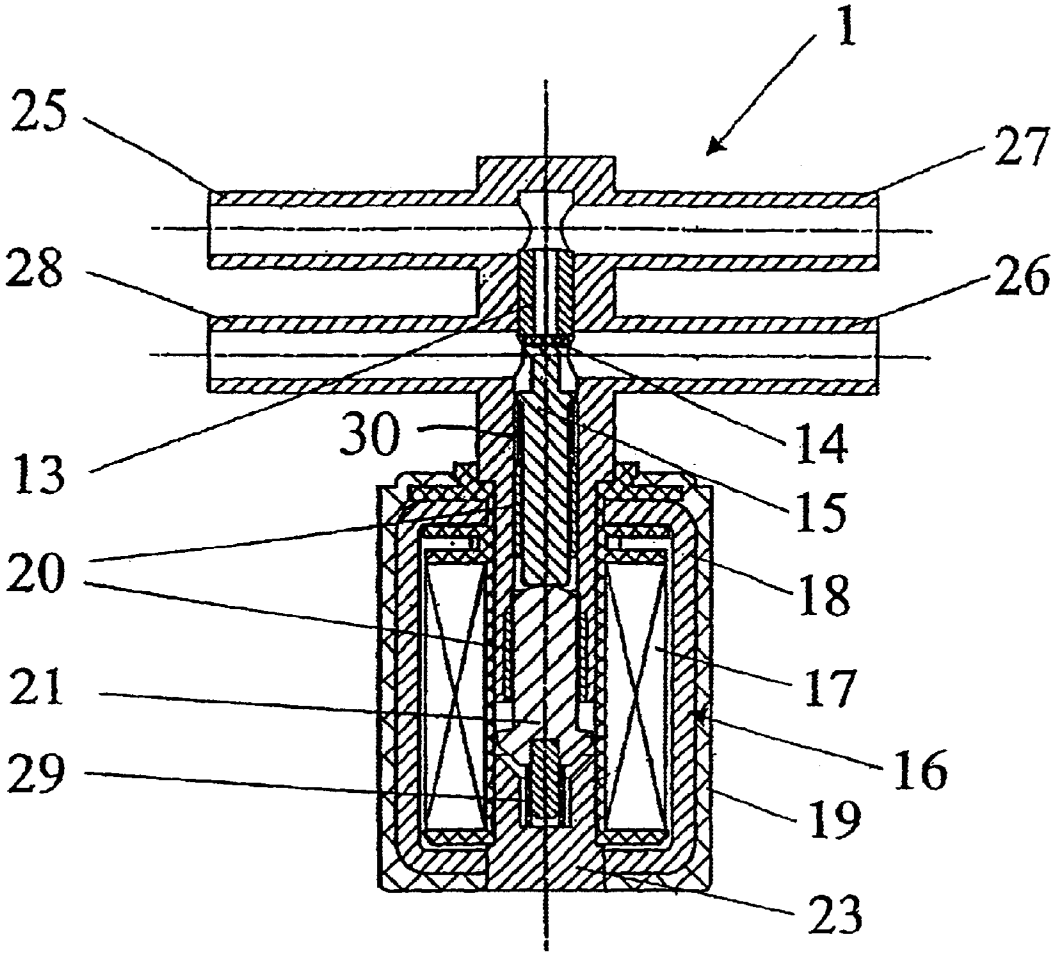
FIG. 3 is a cross sectional view of a second embodiment of the valve arrangement according to the invention.

FIG. 3 shows a cross section of a second embodiment of a valve arrangement 1'. The same elements with the same function have the same reference numerals. The valve arrangement 1' has two inlet connections 25 and 26 and two outlet connections 27 and 28. Valve arrangement 1' is connected directly to delivery pump 3 by inlet connection 25, and fuel is transported to high-pressure pump 4 by outlet connection 27. The second inlet connection 26 is connected to pressure regulator 6 and brings excess fuel back into fuel tank 2 via outlet connection 28. Connection channel 13 thus simultaneously takes on the function of bypass line 7 shown in FIG. 1.

Valve arrangement 1' operates in a "current-off closed" state, in contrast to valve arrangement 1 of FIG. 2. That is, in the current-off state, the maximum pressure level of approximately 7 bars is achieved by the closing force which acts on closing element 14. For this purpose, the valve arrangement 1' has a pressure spring 29, which acts on armature 21 in the closing direction and a second pressure spring 30, which acts on tappet 15 in the closing direction. Both pressure springs 29 and 30 are supported on the housing and produce a combined maximum spring force, which corresponds to a pressure level of approximately 7 bars. In the engine startup phase, this valve arrangement 1' is not supplied with electrical current so that fuel is transported at 7 bars to the high-pressure pump 4. When the pressure level of 7 bars is exceeded, closing element 14 opens and thus opens bypass line 7 via the connection channel 13, so that fuel can return to fuel tank 2. In the operating phase of the internal combustion engine, valve arrangement 1' is supplied with current and the magnetic fore moves armature 21 against pressure spring 29, so that only pressure spring 30 still acts on tappet 15 at a pressure of 4 bars, so that the valve opens when a pressure exceeds 4 bars and fuel can be returned to fuel tank 2 through connection 28.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A valve arrangement for pressure regulation of fuel introduction to an internal combustion engine having pressure regulating and shutoff functions, comprising a housing provided with at least one inlet connection and at least one outlet connection connected by a connection channel, an electromagnetic drive comprising an armature which acts on a tappet supporting a closing element, which opens or closes the connection channel, and at least one pressure spring acting on the closing element in a closing direction of the connection channel, said at least one pressure spring and said electromagnetic drive acting in combination to maintain said connection channel closed by said closing element at two different pressures depending on whether or not the electromagnetic drive is energized.

2. The valve arrangement according to claim 1, wherein said electromagnetic drive includes a coil to urge the armature, when the electromagnetic drive is energized, in a direction to close the connection channel together with said at least one spring.

3. The valve arrangement according to claim 1, wherein said electromagnetic drive includes a coil which urges the armature in a direction to open the connection channel when the electromagnetic drive is energized.

4. The valve arrangement according to claim 3, wherein said at least one pressure spring includes first and second springs acting in the closing direction, said armature acting in opposition to both springs when the electromagnetic drive is energized.

5. The valve arrangement according to claim 4, wherein the housing has two said inlet connections, and two said outlet connections.

6. The valve arrangement according to claim 5, comprising an armature core supporting said armature for adjustable movement in said housing, to adjust spring pressure urging the closing element closing the connection channel and electromagnetic drive of the armature.

7. The valve arrangement according to claim 6, wherein said first spring acts on said armature core.

8. The valve arrangement according to claim 7, wherein said armature core is adjustable longitudinally to adjust the spring pressure and angularly to adjust the magnetic drive.

9. The valve arrangement according to claim 8, wherein said armature core has an elliptical outer contour whereby by angularly adjusting the core the electromagnetic force is adjustable.

10. The valve arrangement according to claim 4, wherein said first and second springs act with different pressures to close the connection channel by the closing element, said armature, when activated by said coil, producing a pressure in opposition to said first and second springs which is less than the combined pressure of the first and second springs.

11. The valve arrangement according to claim 10, wherein said pressure produced by the armature is equal to the pressure of the first spring and less than the pressure of the second spring.

12. The valve arrangement according to claim 11, wherein said first spring acts on said core and said second spring acts on said tappet.

13. The valve arrangement according to claim 5 wherein one inlet connection is connected to a pressurized fuel supply, one outlet connection is connected to said inlet connection and fuel delivery thereto is regulated by said closing element, the other inlet connection receiving fuel from a pressure regulator downstream of a fuel distributor of the engine, said other outlet connection being connected to said other inlet connection to return fuel to the fuel supply.

14. A valve arrangement for pressure regulation of fuel introduction to an internal combustion engine having pressure regulating and shutoff functions, comprising a housing provided with at least one inlet connection and at least one outlet connection connected by a connection channel, an electromagnetic drive comprising an armature which acts on a tappet supporting a closing element, which opens or closes the connection channel, and at least one pressure spring acting on the closing element in a closing direction of the connection channel, wherein pressure force of said at least one spring and of said armature are adapted to close the connection channel by said closing element with a defined force when the electromagnetic drive is not energized, and wherein when the electromagnetic drive is energized, said connection channel remains closed but pressure of said at least one spring in the closing element is reduced by a determined amount.

15. The valve arrangement according to claim 14, wherein said at least one spring includes first and second springs acting to close said closing element and said armature acts in a direction opposite said first and second springs.

16. The valve arrangement according to claim 15, wherein said first and second springs act with a force of 7 bars to close said closing element and said armature acts with a force of 3 bars in opposition to said spring whereby the closing element is closed with a force of 7 bars when the electromagnetic drive is not energized and with a force of 4 bars when the electromagnetic drive is energized.

17. The valve arrangement according to claim 15, wherein said electromagnetic drive includes a core, at least one of said springs acting against said core, said core being adjustable longitudinally to adjust spring pressure on said closing element and being adjustable angularly to adjust electromagnetic drive.

18. A valve arrangement for pressure regulation of fuel introduction to an internal combustion engine having pressure regulating and shutoff functions, comprising a housing provided with at least one inlet connection and at least one outlet connection connected by a connection channel, an electromagnetic drive comprising an armature which acts on a tappet supporting a closing element, which opens or closes the connection channel, a pressure spring acting on the closing element in a closing direction of the connection channel wherein when the electromagnetic drive is energized, said connection channel is closed at a high pressure produced by the spring and the armature together whereas when the electromagnetic drive is de-energized, the connection channel remains closed by the closing element at a low pressure produced by said spring alone.

19. The valve arrangement according to claim 18, wherein said spring acts with a force of 7 bars on said closing element in the closing direction opening direction whereby when the electromagnetic drive is de-energized the valve is closed with a force of 7 bars whereas when the electromagnetic drive is de-energized the valve is closed with a force of 4 bars.

20. The valve arrangement according to claim 18, wherein said electromagnetic drive includes a coil, an armature and a core, said spring acting against said core, said core being adjustable longitudinally to adjust the spring pressure and angularly to adjust electromagnetic drive.

21. A method of controlling pressure in a line at two different pressure levels comprising controlling pressure in the line by connecting to the line a valve having a closure element which is closed and pressurized at two different pressure levels by a spring means and an electromagnetic drive depending on whether or not the electromagnetic drive is energized.

22. The method of claim 21, wherein said line is connected between a pressurized fuel supply and a high pressure pump of a fuel distributor of an internal combustion engine, the method further comprising connecting the valve to selectively control the pressure in the line at said two pressure levels and to return fuel to the pressurized fuel supply when the pressure in the line exceeds the selected pressure level.

23. A fuel circuit comprising a fuel tank, a low pressure pump for delivering fuel at a determined pressure value to a high pressure pump which supplies fuel to a fuel distributor and a valve connected between the low and high pressure pumps to control pressure of the fuel delivered to the high pressure pump at two distinct values, said valve comprising a closure element which is biased to a closing position at said two distinct pressure values by a spring means and an electromagnetic drive, depending on whether or not the electromagnetic drive is energized, said closure element acting at said two distinct pressure values to limit pressure in said line to said two distinct values.

24. The fuel circuit of claim 23, wherein the higher of the two distinct pressure values is equal to the pressure of the low pressure fuel pump.

* * * * *